United States Patent
Torbohm et al.

(10) Patent No.: US 10,337,496 B2
(45) Date of Patent: Jul. 2, 2019

(54) SYSTEM AND METHOD FOR CONTROLLING A WIND TURBINE DURING ADVERSE WIND CONDITIONS

(71) Applicant: General Electric Company, Schenectady, NY (US)

(72) Inventors: Gert Torbohm, Rheine (DE); Darren John Danielsen, Glenville, NY (US); David Cole Magnuson, Greenville, SC (US); Simi Gopalan, Bangalore (IN)

(73) Assignee: General Electric Company, Schenectady, NY (US)

( * ) Notice: Subject to any disclaimer, the term of this patent is extended or adjusted under 35 U.S.C. 154(b) by 1248 days.

(21) Appl. No.: 14/556,331

(22) Filed: Dec. 1, 2014

(65) Prior Publication Data

US 2016/0153425 A1 Jun. 2, 2016

(51) Int. Cl.
*F03D 7/04* (2006.01)
*F03D 7/02* (2006.01)
*F03D 17/00* (2016.01)

(52) U.S. Cl.
CPC ............. *F03D 7/043* (2013.01); *F03D 7/028* (2013.01); *F03D 7/0268* (2013.01); *F03D 17/00* (2016.05); *F05B 2260/8211* (2013.01); *F05B 2270/1033* (2013.01); *F05B 2270/32* (2013.01); *F05B 2270/325* (2013.01); *F05B 2270/328* (2013.01); *F05B 2270/335* (2013.01); *Y02E 10/723* (2013.01)

(58) Field of Classification Search
CPC ........ F03D 7/0268; F03D 7/042; F03D 17/00; F03D 7/0224; F03D 7/0264; F03D 7/043; F03D 7/028
See application file for complete search history.

(56) References Cited

U.S. PATENT DOCUMENTS 6,619,918 B1   9/2003   Rebsdorf
6,809,431 B1  10/2004   Schippmann
7,476,985 B2 * 1/2009   Llorente Gonzalez ......................
                                    F03D 7/0264
                                    290/44

(Continued)

FOREIGN PATENT DOCUMENTS

EP     2233736 A2    9/2010
EP     2583125 A2    4/2013

(Continued)

OTHER PUBLICATIONS

European Search Report and Opinion issued in connection with corresponding EP Application No. 15195562.2 dated Apr. 22, 2016.

*Primary Examiner* — Jason D Shanske
*Assistant Examiner* — Maxime M Adjagbe
(74) *Attorney, Agent, or Firm* — Dority & Manning, P.A.

(57) ABSTRACT

The present disclosure is directed to a system and method for controlling a wind turbine during adverse wind conditions. In one embodiment, the method includes monitoring one or more wind conditions near the wind turbine. Another step includes detecting one or more adverse wind conditions near the wind turbine. In response to detecting one or more adverse wind conditions, the method also includes reducing a power output of the wind turbine by a predetermined percentage. Further, the predetermined percentage is a function of a number and a type of the detected adverse wind conditions occurring during a predetermined time period.

15 Claims, 6 Drawing Sheets

(56) References Cited

U.S. PATENT DOCUMENTS

| | | |
|---|---|---|
| 7,573,149 B2 | 8/2009 | Kammer et al. |
| 7,629,702 B2 | 12/2009 | Schubert |
| 8,109,723 B2 | 2/2012 | Baba |
| 8,202,048 B2 | 6/2012 | Stiesdal et al. |
| 2008/0001409 A1* | 1/2008 | Schellings ............ F03D 7/0204 290/44 |
| 2013/0297085 A1* | 11/2013 | Xiongzhe ............. F03D 7/0276 700/287 |

FOREIGN PATENT DOCUMENTS

| | | |
|---|---|---|
| EP | 2636893 A1 | 9/2013 |
| EP | 2778395 A2 | 9/2014 |
| WO | WO 97/09531 | 3/1997 |

\* cited by examiner

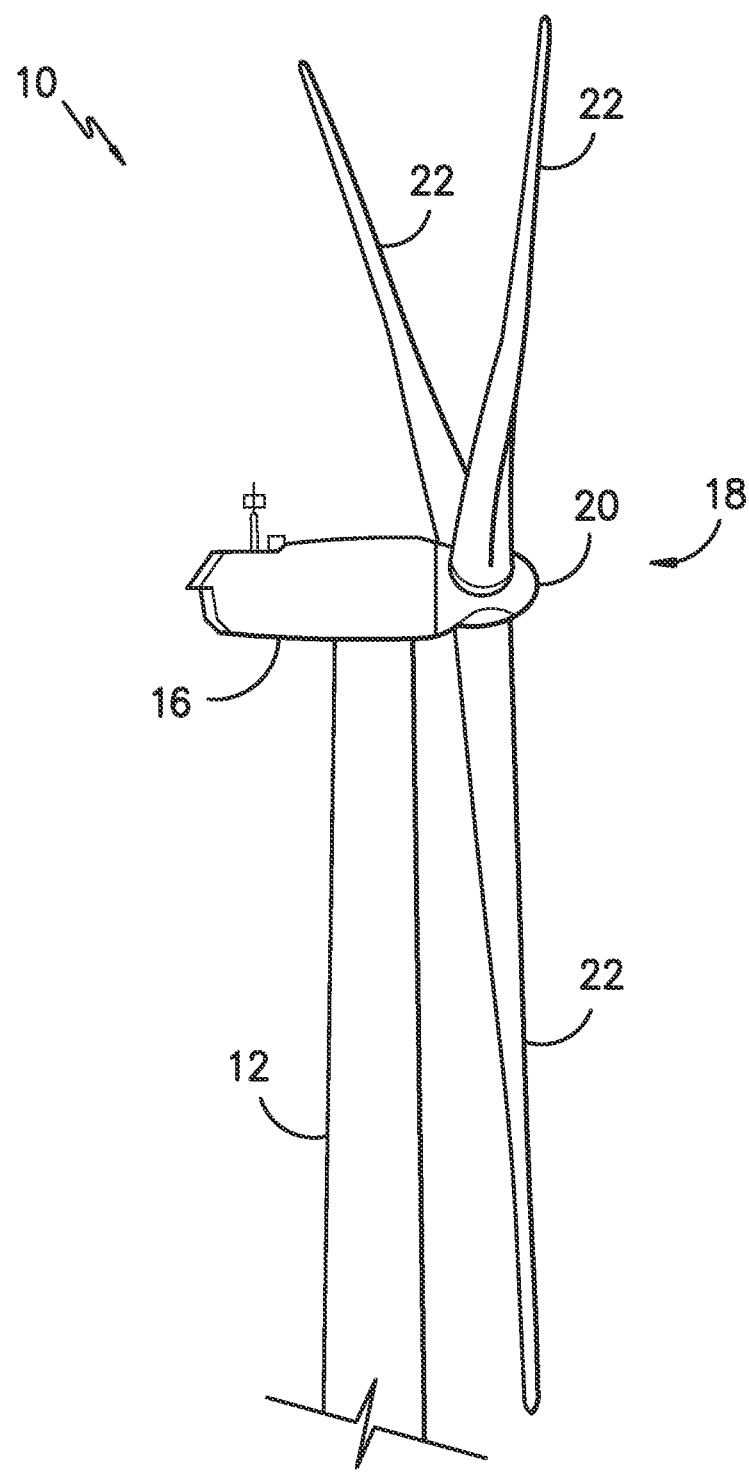
FIG. -1-

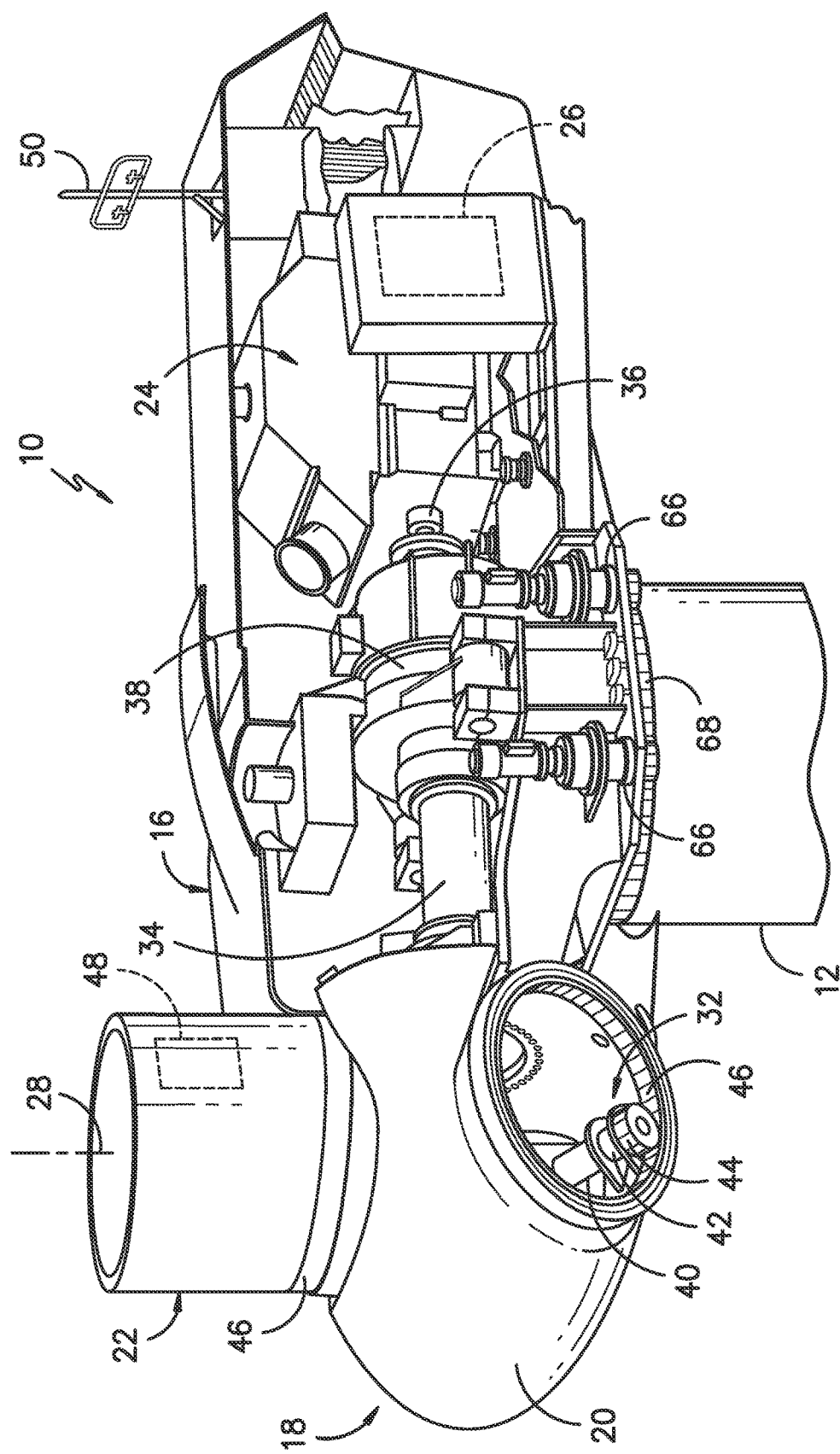
FIG. -2-

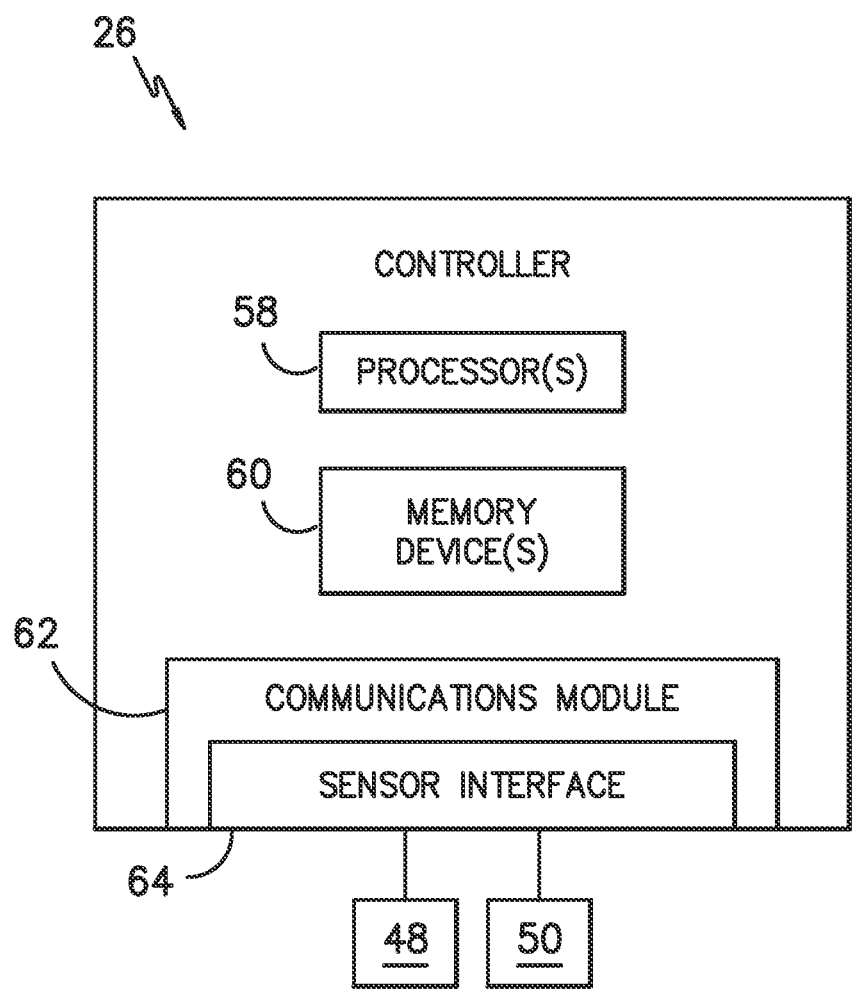
FIG. -3-

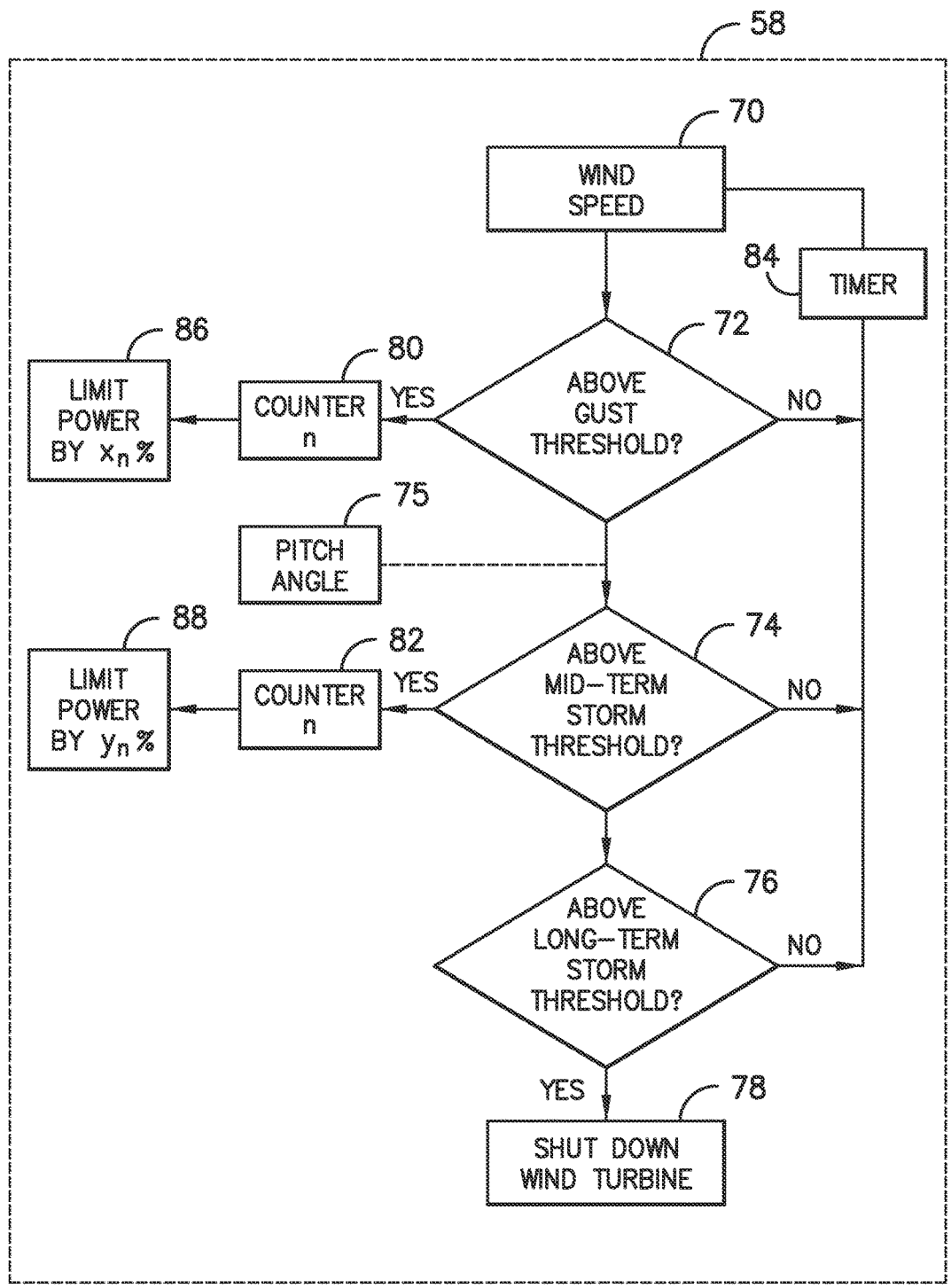
FIG. -4-

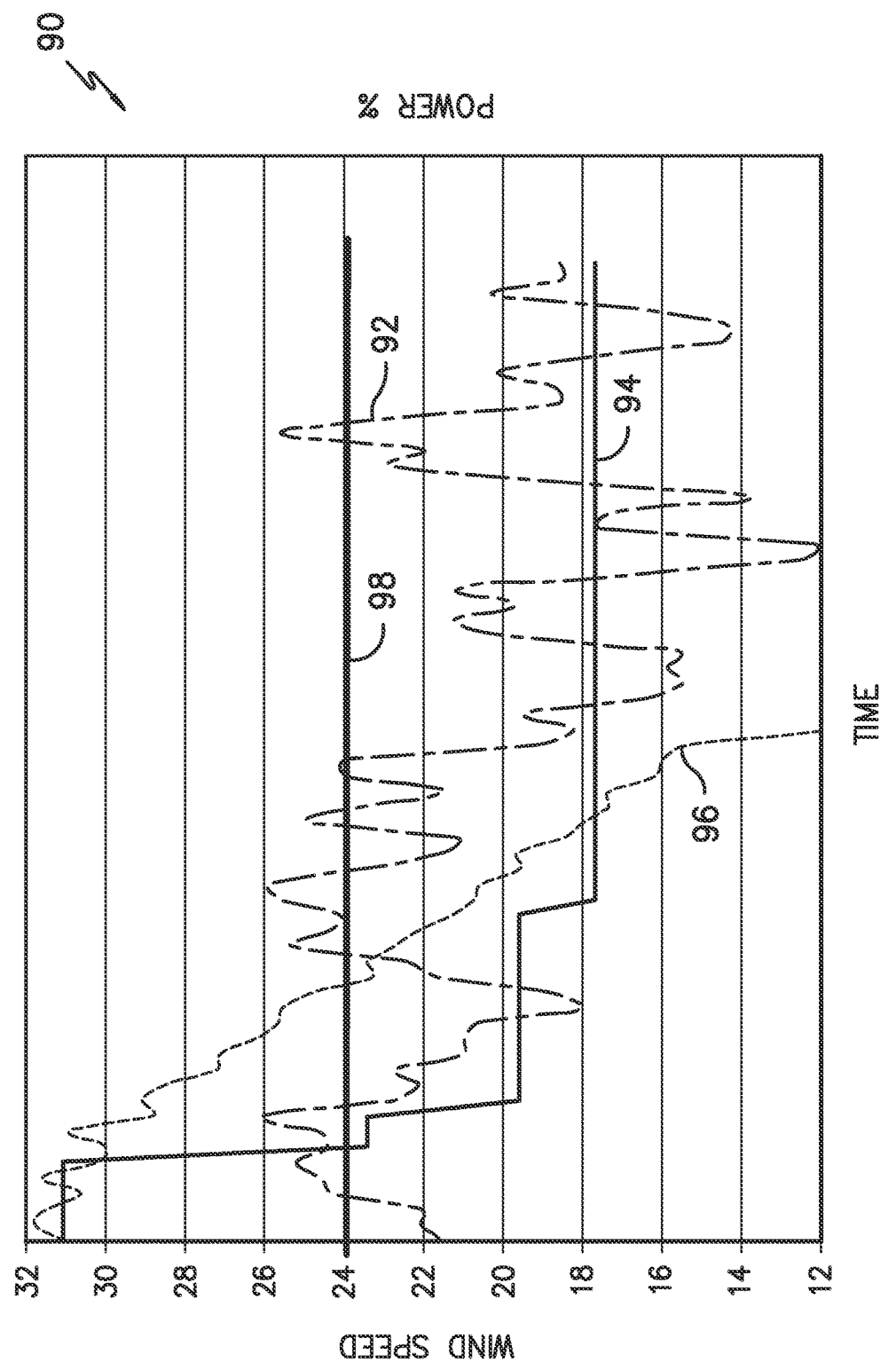
FIG. -5-

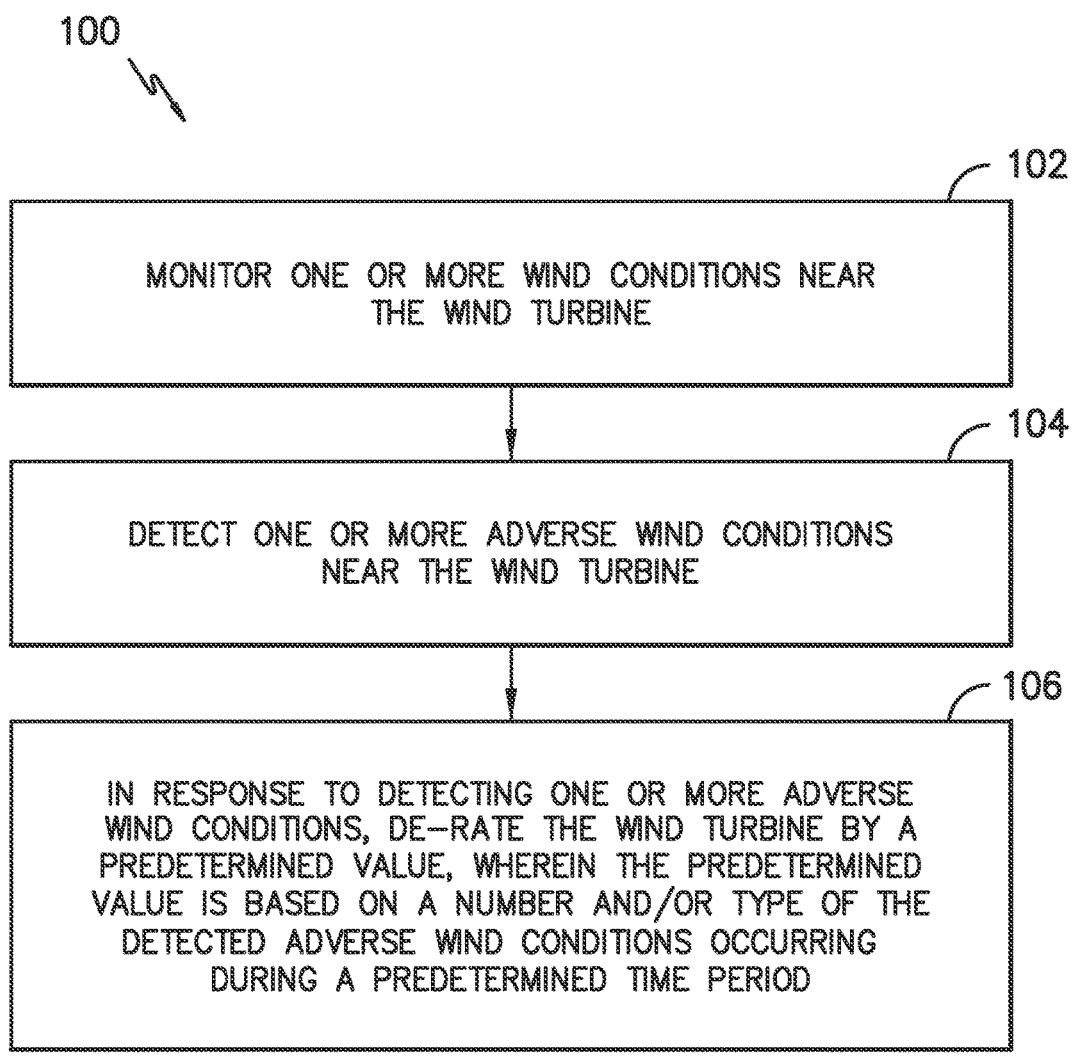
FIG. -6-

SYSTEM AND METHOD FOR CONTROLLING A WIND TURBINE DURING ADVERSE WIND CONDITIONS

FIELD OF THE INVENTION

The present disclosure relates generally to wind turbines, and more particular to a system and method for controlling a wind turbine during adverse wind conditions.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

High wind speeds are critical for wind turbines and allow the wind turbine to generate power. At certain high wind speeds (i.e. a cut out wind speed), however, a control strategy must be implemented to maintain the loads of the wind turbine within the design load envelope for each of the wind turbine components. Thus, many control technologies shut down the wind turbine above the cut out wind speed to protect the various components. Though this strategy prevents damaging loads that might occur due to the higher turbulence in the wind, the lack of energy capture in the region above cut out wind speed is a disadvantage. Also, a brief increase in wind speed might trigger a turbine shutdown, while the recovery to normal power production may take some time. On the same token, the occurrence of high turbulence at rated wind speeds will also increase the likelihood of triggering a turbine shutdown.

Accordingly, an improved system and method for controlling a wind turbine that addresses the aforementioned issues above would be advantageous. More specifically, a system and method that utilizes a statistical approach for determining a reduction in the power output of the wind turbine based on a function of a number and type of detected adverse wind conditions occurring during a certain time period would be desired.

BRIEF DESCRIPTION OF THE INVENTION

Aspects and advantages of the invention will be set forth in part in the following description, or may be obvious from the description, or may be learned through practice of the invention.

One example aspect of the present disclosure is directed to a method for controlling a wind turbine during adverse wind conditions. The method includes monitoring one or more wind conditions near the wind turbine. Another step includes detecting one or more adverse wind conditions near the wind turbine. In response to detecting one or more adverse wind conditions, the method also includes reducing a power output of the wind turbine by a predetermined percentage. For example, in certain embodiments, the predetermined percentage is a function of a number and/or a type of the detected adverse wind conditions occurring during a predetermined time period. Further, the predetermined percentage is less than 100% of rated power. In other words, the power output of the wind turbine can be limited based on a statistical approach rather than completely shutting down the wind turbine.

In one embodiment, the wind conditions may include any one of or combination of the following: wind speed, wind gusts, wind shears, wind turbulence, or any other wind condition. Thus, in additional embodiments, the monitored wind conditions can be used to determine the presence of adverse wind conditions. More specifically, the adverse wind conditions may include at least one of the following types: short-term wind gusts, mid-term storm conditions, long-term storm conditions, or any other adverse condition that may potentially cause damage to the wind turbine.

In further embodiments, the method may include tracking the number of detected adverse wind conditions occurring during a predetermined time period. Thus, in particular embodiments, the method includes increasing the predetermined percentage as the tracked number of detected adverse wind conditions occurring during the predetermined time period increases. In addition, in certain embodiments, the method may include decreasing the predetermined percentage as the tracked number of detected adverse wind conditions occurring during the predetermined time period decreases.

In various embodiments, the predetermined threshold and the predetermined time period may vary as a function of the type of the adverse wind conditions. Thus, in certain embodiments, the step of detecting one or more adverse wind conditions may include determining whether one or more of the monitored wind conditions exceeds a short-term gust threshold for a predetermined short time period sufficient to detect wind gusts. In further embodiments, the step of detecting one or more adverse wind conditions may include determining whether one or more of the monitored wind conditions exceeds a mid-term storm threshold for a predetermined longer time period sufficient to detect mid-term storm events. In addition, the method may also include determining whether a blade angle of a rotor blade of the wind turbine exceeds a pitch threshold for the predetermined time period. In still additional embodiments, the step of detecting one or more adverse wind conditions may further include determining whether one or more of the monitored wind conditions exceeds a long-term storm threshold for the predetermined time period. In certain embodiments, the long-term storm threshold may be higher than the short-term or mid-term storm thresholds.

In another aspect, the present disclosure is directed to a system for controlling a wind turbine during adverse wind conditions. The system includes one or more sensors configured to monitor one or more wind conditions near the wind turbine and a processor communicatively coupled to the sensors. The processor is configured to perform one or more operations, including but not limited to: detecting one or more adverse wind conditions near the wind turbine and as a result, detecting one or more adverse wind conditions, reducing a power output of the wind turbine by a predetermined percentage. More specifically, the predetermined percentage is a function of a number and/or a type of the detected adverse wind conditions occurring during a predetermined time period. Further, in certain embodiments, the predetermined percentage may be less than 100% of rated power. It should be understood that the system may also include any of the additional features as described herein.

In yet another aspect, the present disclosure is directed to a method for controlling a wind turbine during adverse wind conditions. The method includes monitoring one or more wind conditions near the wind turbine. Another step includes detecting one or more adverse wind conditions near the wind turbine. In response to detecting one or more adverse wind conditions, the method also includes de-rating the wind turbine by a predetermined value. More specifically, the predetermined percentage is a function of a number and/or a type of the detected adverse wind conditions occurring during a predetermined time period. In certain embodiments, the step of de-rating the wind turbine may include at least one of the following: altering a pitch angle of a rotor blade, modifying a generator torque, modifying a generator speed, modifying a power output, yawing a nacelle of the wind turbine, braking one or more wind turbine components, activating an airflow modifying element on a rotor blade, or any other suitable control action. It should be understood that the method may also include any of the additional features and or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to conventional construction;

FIG. 2 illustrates a detailed perspective view of one embodiment of a nacelle of the wind turbine configuration shown in FIG. 1;

FIG. 3 illustrates a block diagram of one embodiment of a controller of the wind turbine configuration shown in FIG. 1;

FIG. 4 illustrates a schematic diagram of one embodiment of a control scheme implemented by the processor according to the present disclosure;

FIG. 5 illustrates a graph of one embodiment of a power output according to the present disclosure plotted against the power output according to conventional construction; and FIG. 6 illustrates a flow diagram of one embodiment of a method for controlling a wind turbine during adverse wind conditions according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for controlling a wind turbine during adverse weather conditions using a statistical approach. More specifically, in one embodiment, a plurality of sensors monitor one or more wind conditions near the wind turbine. The wind conditions may include, for example wind speed, wind gusts, wind shears, wind turbulence, air density, or temperature. Further, the phrase "near the wind turbine" is meant to encompass, at least, conditions acting at or nearby a particular wind turbine, as well as conditions acting at or nearby neighboring wind turbines in a wind farm. If one or more adverse wind conditions are detected, then, the system is configured to reduce a power output of the wind turbine by a predetermined percentage. As used herein, "adverse" wind conditions generally refers to any of the above wind conditions that exceed a certain threshold such that the conditions can potentially cause damage to the turbine, including but not limited to: short-term wind gusts, mid-term storm conditions, or long-term storm conditions. In other words, if the monitored wind speed is above a certain threshold for a certain amount of time, then one of the above adverse wind conditions may be occurring near the wind turbine. Thus, the system can determined the predetermined percentage as a function of the number and type of detected adverse wind conditions occurring during a predetermined time period such that the power output can be limited, but not eliminated, so as to reduce corresponding loads.

Referring now to the drawings, FIG. 1 illustrates a perspective view of a portion of an exemplary wind turbine 10 according to the present disclosure. The wind turbine 10 includes a nacelle 16 that typically houses a generator (not shown). The nacelle 16 is mounted on a tower 12 having any suitable height that facilitates operation of wind turbine 10 as described herein. The wind turbine 10 also includes a rotor 18 that includes three blades 22 attached to a rotating hub 20. Alternatively, the wind turbine 10 may include any number of blades 22 that facilitates operation of the wind turbine 10 as described herein.

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24. The wind turbine 10 may also include a controller 26 configured to control various aspects of operation, as discussed in more detail below.

Each rotor blade 22 may also include a pitch adjustment mechanism 32 configured to rotate each rotor blade 22 about its pitch axis 28. Further, each pitch adjustment mechanism 32 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 108 about the pitch axis 28. Similarly, the wind turbine 10 may include one or more yaw drive mechanisms 66 communicatively coupled to the controller 26, with each yaw drive mechanism(s) 66 being configured to change the angle of the nacelle 16 relative to the wind (e.g., by engaging a yaw bearing 68 of the wind turbine 10).

In addition, the wind turbine 10 may also include one or more sensors 48, 50 for monitoring various wind conditions near the wind turbine 10. More specifically, the sensors may be configured to measure one or more of the following wind conditions: wind speed, wind gusts, wind shears, wind turbulence, air density, and/or temperature. In addition, the sensors may include blade sensors 48 for monitoring the rotor blades 22 (e.g. the pitch angle of the rotor blades 22) and/or wind sensors 50 for monitoring the wind speed. Of course, the wind turbine 10 may further include various other suitable sensors for measuring any other suitable loading and/or operating conditions of the wind turbine 10.

Referring now to FIG. 3, there is illustrated a block diagram of one embodiment of suitable components that may be included within the controller 26 in accordance with aspects of the present subject matter. As shown, the controller 26 may include one or more processor(s) 58 and associated memory device(s) 60 configured to perform a variety of computer-implemented functions (e.g., performing the methods, steps, calculations and the like and storing relevant data as disclosed herein). Additionally, the controller 26 may also include a communications module 62 to facilitate communications between the controller 26 and the various components of the wind turbine 10. Further, the communications module 62 may include a sensor interface 64 (e.g., one or more analog-to-digital converters) to permit signals transmitted from the sensors 48, 50 (such as wind conditions) to be converted into signals that can be understood and processed by the processors 58. It should be appreciated that the sensors 48, 50 may be communicatively coupled to the communications module 62 using any suitable means. For example, as shown, the sensors 48, 50 are coupled to the sensor interface 64 via a wired connection. However, in other embodiments, the sensors 48, 50 may be coupled to the sensor interface 64 via a wireless connection, such as by using any suitable wireless communications protocol known in the art.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 60 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 60 may generally be configured to store suitable computer-readable instructions that, when implemented by the processor(s) 58, configure the controller 26 to perform various functions including, but not limited to, determining one or more current wind turbine parameters of the wind turbine 10 based on the plurality of operating data, determining a maximum wind turbine parameter, transmitting suitable control signals to implement control actions to reduce loads acting on the wind turbine, and various other suitable computer-implemented functions.

A typical operating range for the wind turbine 10 occurs at a wind speed, for example, of between about 3 meters/second (m/s) to about 25 m/s. Currently, the control strategy is to shut down the wind turbine above a certain (cut out) wind speed, for example, of about 25 m/s. The main reason for this strategy is to prevent damaging loads that might occur due to wind gusts and/or turbulence at high wind speeds. However, the disadvantage of this strategy is the lack of energy capture in the region above cut out wind speed because when a conventional wind turbine has been shut down, it cannot reconnect to the grid at the same wind speed because of the very high loading of the turbine at such a wind speed. Thus, reconnection will occur when the wind speed is lower than the cut out wind speed for an appropriate amount of time for example, about 30 minutes or more. Another disadvantage of this strategy is that a brief increase in wind speed might trigger a turbine shutdown in a conventional wind turbine, while the recovery to normal power production may take some time. On the same token, the occurrence of high turbulence at rated wind speeds will also increase the likelihood of triggering a turbine shutdown. Besides the loss in energy capture, turbine shutdowns cause potential problems to the grid stability due to the abrupt change in generated power.

As such, one aspect of the present invention is to reduce power output by a certain percentage based on how often adverse wind conditions (e.g. high wind speed, extreme wind gusts, or wind turbulence) are detected within a certain period of time. For example, in certain embodiments, the wind turbine 10 is operated at rated power and if one or more adverse wind conditions are detected, then the processor 58 is configured to reduce the power output by a predetermined percentage that is less than 100% of the rated power. More specifically, as shown in FIG. 4, the processor 58 monitors one or more wind conditions, e.g. wind speed 70, and compares the wind speed 70 to different thresholds 72, 74, 76 to determine whether the power output of the wind turbine 10 should be reduced and by how much. In particular embodiments, the thresholds 72, 74, 76 and the time periods may vary as a function of the type of the adverse wind conditions. As shown in the illustrated embodiment, the types of adverse wind conditions include short-term wind gusts, mid-term storm conditions, long-term storm conditions, and/or any other wind conditions that may potentially cause damage to the wind turbine 10.

More specifically and referring to FIG. 4 at 72, the processor 58 determines whether the wind speed 70 is above a short-term gust threshold. If the wind speed 70 is above the gust threshold, then the processor 58 is configured to limit the power output by a certain percentage. More specifically, in one embodiment, the processor 58 is configured to track the number of wind gusts detected within a certain time period via counter 80. Thus, the processor 58 can increase the predetermined percentage if the tracked number of detected adverse wind conditions occurring during a certain time period increases. Similarly, the processor 58 can decrease the predetermined percentage if the tracked number of detected adverse wind conditions occurring during a certain time period decreases. Thus, in certain embodiments, when the processor 58 detects a storm/gust condition, the processor 58 is configured to decrease power. However, if the processor 58 does not detect a storm-gust condition for a certain time, then the processor 58 is configured to increase power again. In additional embodiments, the processor 58 can generate a function for increasing or decreasing power. It should be understood that any type of function may be used to increase or decrease power, including, for example, both linear and non-linear functions.

More specifically, after each wind gust detection, the processor 58 may be configured to limit the power output at 86 by a predetermined percentage which may vary based on the type and/or count of the wind condition detected, i.e. a wind gust and/or mid-term storm conditions. For example, if the processor 58 detects one or more wind gusts, then the processor 58 is configured to limit the power output by a short-term predetermined percentage $x_n\%$, where n represents the number of wind gusts detected for a certain time period, e.g. 2-5 seconds. Thus, for wind gusts, the short-term predetermined percentage $x_n\%$ may be lower than, for example, the predetermined percentage for mid-term storm conditions. Alternatively, the short-term predetermined percentage may be equal to the predetermined percentage for mid-term storm conditions. If the wind speed 70 is below the gust threshold, the wind turbine 10 can maintain normal operation and the processor 58 can continue to monitor the wind speed 70 to monitor how long the wind turbine 10 operates without a wind gust occurring via timer 84.

At 74, the processor 58 is configured to determine whether the wind speed 70 is above a mid-term storm threshold. In addition, the processor 58 may also determine whether a pitch angle 75 is above a pitch threshold in load operation. If the wind speed 70 is above the mid-term storm threshold (or the pitch angle is above a pitch threshold), then the processor 58 is configured to limit the power output by a certain percentage. In addition, the processor 58 is configured to track the number of adverse wind conditions (e.g. wind gusts) detected within a certain time period via counter 82.

After each detection, if the processor 58 determines that the wind conditions are reflective of mid-term storm conditions, then the processor 58 is configured to limit the power output at 88 by a mid-term predetermined percentage $y_n\%$, where n represents a number of wind conditions detected for a certain time period. In certain embodiments, the predetermined percentage $y_n\%$ for the mid-term storm condition may be greater than the short-term predetermined percentage. Alternatively, the mid-term predetermined percentage may be equal to the predetermined percentages for the short-term wind conditions. Further, if the wind speed 70 is below the mid-term storm threshold, then the wind turbine 10 is configured to maintain normal operation such that the processor 58 continues to monitor the wind speed 70 to track how long the wind turbine 10 operates without a wind gust occurring via timer 84. Thus, in certain embodiments, if no adverse wind conditions are detected for a certain time period, then the processor 58 is configured to increase the power output that may have been previously decreased in a step-by-step manner.

At 76, the processor 58 determines whether one or more wind conditions (e.g. wind speed 70) is above a long-term storm threshold. Long-term storm conditions are typically characterized as storm conditions lasting for a certain amount of time (e.g. 10 minutes or more) and may also include extreme wind gusts. Thus, at 78, if the wind speed 70 is above the long-term storm threshold, the processor 58 is configured to switch off the wind turbine 10 via a smooth braking procedure. More specifically, the processor 58 is configured to start the braking procedure and proceed with it until cut-out. If the wind speed drops below a threshold that is less than the long-term threshold, then the processor 58 is configured to ramp-up power to a limited level and speed to near rated speed. Otherwise, the processor 58 continues with the braking procedure until the wind turbine 10 is shut down completely. If the wind speed 70 is below the long-term storm threshold, the wind turbine 10 maintains normal operation and/or limits the power output according to the control strategies above relating to short-term wind gusts and/or mid-term storm conditions. Further, the processor 58 is configured to continuously monitor the wind speed 70 to track how long the wind turbine 10 operates without a long-term storm condition occurring via timer 84.

Referring now to FIG. 5, a graph 90 illustrating various benefits of the present disclosure is illustrated. As shown, a gust threshold is represented by line 98. The wind speed is represented by line 92. Further, the power output 94 is of the present disclosure is compared to the power output 96 of previous control technologies. As shown, the power output 94 of the present disclosure is higher than the power output 96 of previous technologies, thereby providing increased value to the wind turbine 10.

Referring now to FIG. 6, a flow diagram for a method 100 for controlling a wind turbine during adverse wind conditions is illustrated. As shown at 102, the method 100 includes monitoring one or more wind conditions near the wind turbine. At 104, the method 100 includes detecting one or more adverse wind conditions near the wind turbine. At 106, in response to detecting one or more adverse wind conditions, the method 100 also includes de-rating the wind turbine by a predetermined value. The predetermined value is based on a number and/or type of the detected adverse wind conditions occurring during a predetermined time period. In certain embodiments, the step of de-rating the wind turbine may include at least one of the following: altering a pitch angle of a rotor blade, modifying a generator torque, modifying a generator speed, modifying a power output, yawing a nacelle of the wind turbine, braking one or more wind turbine components, activating an airflow modifying element on a rotor blade, or any other suitable control action.

Exemplary embodiments of a wind turbine, a controller for a wind turbine, and methods of controlling a wind turbine are described above in detail. The methods, wind turbine, and controller are not limited to the specific embodiments described herein, but rather, components of the wind turbine and/or the controller and/or steps of the methods may be utilized independently and separately from other components and/or steps described herein. For example, the controller and methods may also be used in combination with other wind turbine power systems and methods, and are not limited to practice with only the power system as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling a wind turbine during adverse wind conditions, the method comprising:
monitoring one or more wind conditions at the wind turbine;
detecting one or more adverse wind conditions at the wind turbine;
counting a number of detected adverse wind conditions occurring during a predetermined time period;
reducing a power output of the wind turbine by a percent reduction based on the number and a type of the detected adverse wind conditions occurring during the predetermined time period.

2. The method of claim 1, wherein the percent reduction is less than 100% of a rated power.

3. The method of claim 1, wherein the type of the detected adverse wind conditions comprise at least one of wind speed, wind gusts, wind shears, wind turbulence, storm conditions, air density, or temperature.

4. The method of claim 1, further comprising increasing the percent reduction as the number of detected adverse wind conditions occurring during the predetermined time period increases.

5. The method of claim 1, further comprising decreasing the percent reduction as the number of detected adverse wind conditions occurring during the predetermined time period decreases.

6. The method of claim 1, wherein the predetermined time period varies as a function of the type of the adverse wind conditions.

7. The method of claim 3, wherein detecting one or more adverse wind conditions further comprises determining whether one or more monitored wind gusts exceeds a gust threshold for the predetermined time period.

8. The method of claim 1, wherein detecting one or more adverse wind conditions further comprises determining whether one or more of the monitored wind conditions exceeds a first storm threshold for the predetermined time period.

9. The method of claim 8, further comprising determining whether a blade angle of a rotor blade of the wind turbine exceeds a pitch threshold for the predetermined time period.

10. The method of claim 8, wherein detecting one or more adverse wind conditions further comprises determining whether one or more of the monitored wind conditions exceeds a second storm threshold for the predetermined time period, wherein the second storm threshold is higher than the first storm threshold.

11. A system for controlling a wind turbine during adverse wind conditions, the system comprising:
one or more sensors configured to monitor one or more wind conditions near the wind turbine; and,
a processor communicatively coupled to the one or more sensors, the processor configured to perform one or more operations, the operations comprising:
detecting one or more adverse wind conditions near the wind turbine;
counting the number of detected adverse wind conditions occurring during a predetermined time period; and
in response to detecting one or more adverse wind conditions, reducing a power output of the wind turbine by a percent reduction based on the number and a type of the detected adverse wind conditions occurring during the predetermined time period.

12. The system of claim 11, wherein the type of adverse wind conditions comprises at least one of the following: wind speed, wind gusts, wind shears, wind turbulence, storm conditions, air density, or temperature.

13. The system of claim 11, further comprising increasing the percent reduction as the number of detected adverse wind conditions occurring during the predetermined time period increases.

14. The system of claim 11, further comprising decreasing the percent reduction as the number of detected adverse wind conditions occurring during the predetermined time period decreases.

15. The system of claim 11, wherein detecting one or more adverse wind conditions further comprises determining whether one or more of the monitored wind conditions exceeds a predetermined threshold for the predetermined time period.

* * * * *